C. A. McCUTCHEON.
BOLT.
APPLICATION FILED JUNE 21, 1917. RENEWED DEC. 19, 1919.

1,362,633.

Patented Dec. 21, 1920.
2 SHEETS—SHEET 1.

Inventor
C. A. McCutcheon
By Norman T. Whitaker
his Attorney

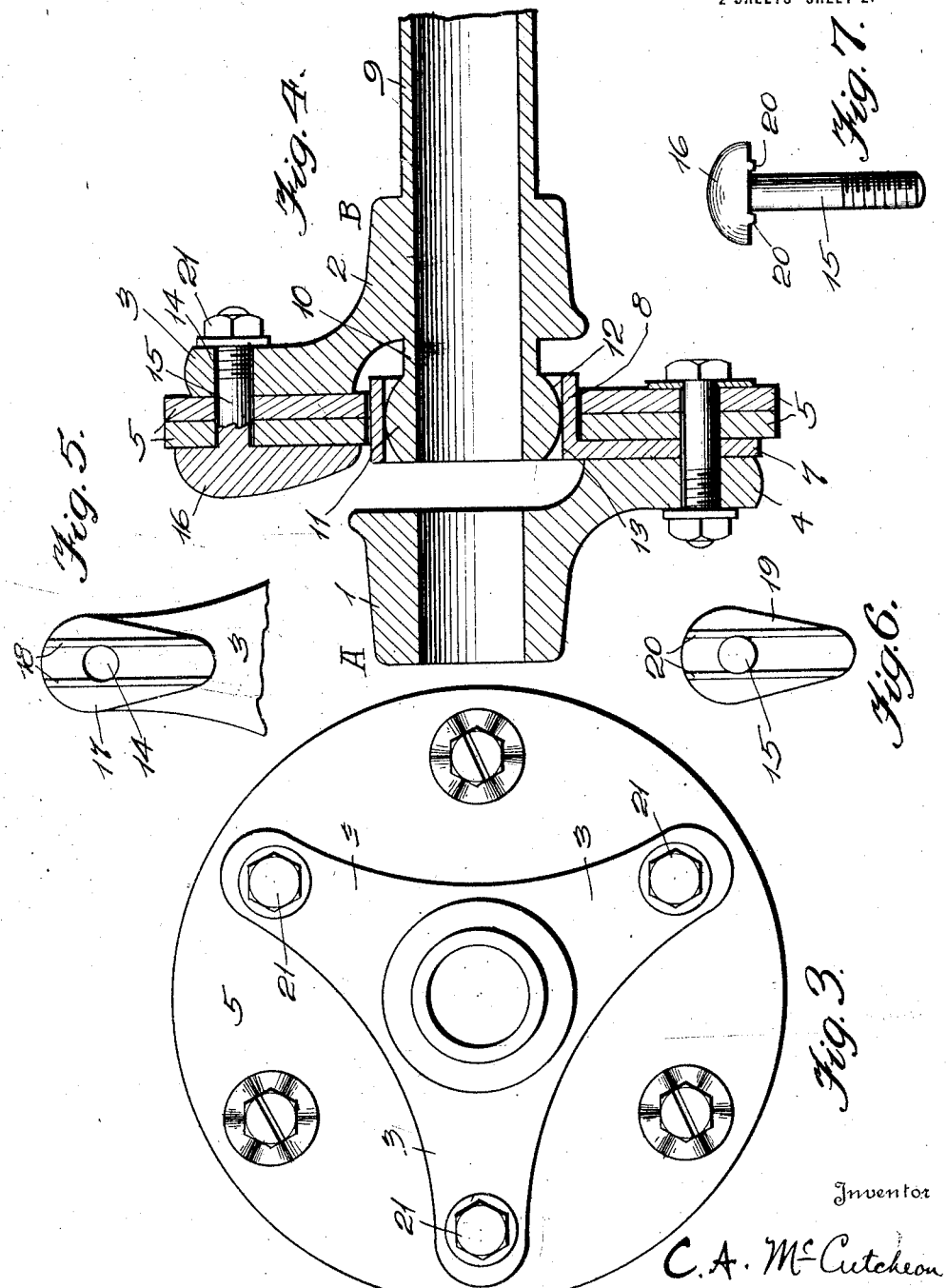

UNITED STATES PATENT OFFICE.

CHARLES ALLEN McCUTCHEON, OF FALCONER, NEW YORK, ASSIGNOR TO THE NORWALK AUTO PARTS COMPANY, OF NORWALK, OHIO, A CORPORATION OF OHIO.

BOLT.

1,362,633.  Specification of Letters Patent.  Patented Dec. 21, 1920.

Application filed June 21, 1917, Serial No. 176,193. Renewed December 19, 1919. Serial No. 346,170.

*To all whom it may concern:*

Be it known that I, CHARLES A. McCUTCHEON, a citizen of the United States, and resident of Falconer, in the county of Chautauqua and State of New York, have invented new and useful Improvements in Bolts, of which the following is a specification.

This invention relates to bolts, and has particular reference to the class of bolts employed in flexible couplings, comprising coupling members and flexible rings, the flexible rings being disposed between the coupling members.

The primary object of my invention is to provide a bolt which will afford a simple and effective means for fastening the flexible rings, employed in the class of flexible couplings described, to one of the coupling members.

Another object of my invention is to provide a bolt having a broad bearing surface which will tend to distribute the strain of rotation through the flexible ring when it is employed in the flexible coupling of the class described.

A still further object of my invention is to provide a bolt having means, associated therewith, which will prevent its being rotated when its coupling nut is being tightened, and which will serve to hold the bolt in the position in which it has been placed when the clamp nut has been clamped down upon the screw threads carried by the bolt.

Other objects and advantages will be apparent in the course of the following description taken in conjunction with the accompanying drawings, and the particular features of novelty will be pointed out in the appended claims.

Figure 2:
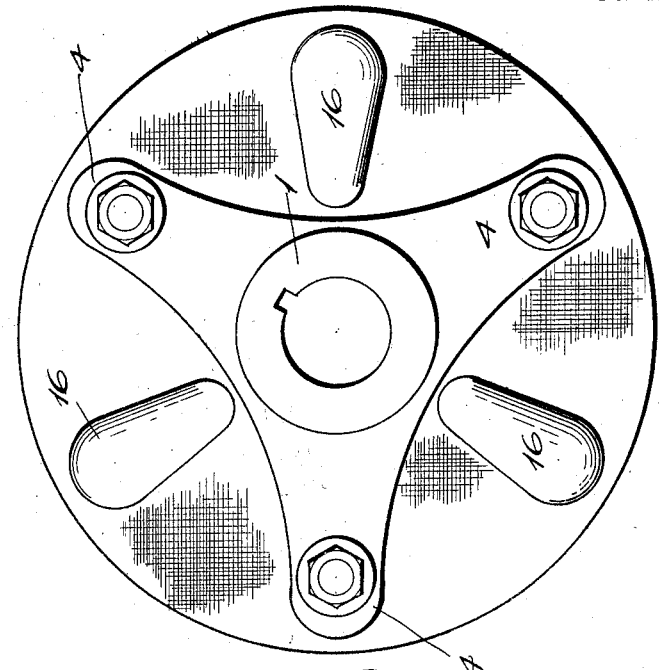
Figure 1:
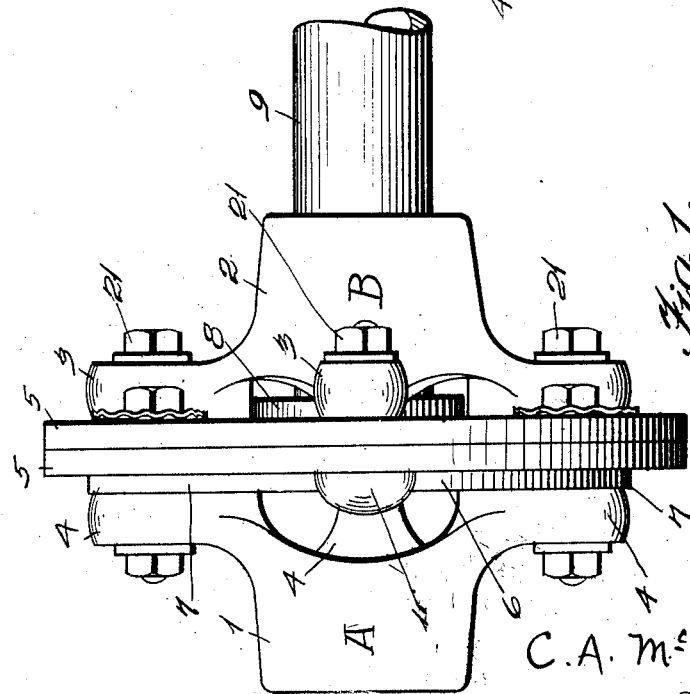

Referring to the drawings in which similar characters of reference indicate similar parts in all the views, Figure 1 is a side elevation of a coupling embodying my invention, Fig. 2 is a face view of the end which is adapted for the reception of the driven shaft, Fig. 3 is a face view of the end which is adapted for the reception of the driving shaft, Fig. 4 is a longitudinal sectional view of Fig. 1, Fig. 5 is an enlarged view of the inner face of the radial arm at its outer end, Fig. 6 is an end view of Fig. 7 viewing it from its threaded end, and Fig. 7 is a side elevation of a bolt.

Referring more particularly to the drawings the reference characters A and B indicate coupling members, which are provided with hubs 1 and 2 respectively. The hub 2 is provided with equidistantly spaced radial fingers 3. The hub 1 is provided with equidistantly spaced radial fingers 4. Between the said members 3 and 4 are disposed flexible rings 5—5. Disposed between the coupling member A and the flexible rings 5—5 is a spider 6 carrying radially extending arms 7. The spider 6 is centrally provided with a flange 8.

The hub 2 is provided at one end with an elongated sleeve 9 adapted for the reception of a driving shaft, and at its other end is provided with a sleeve 10 which carries an enlarged portion 11. The enlarged portion 11 is provided with a curvilinear face 12 adapted to movably engage the inner face 13 of the flange 8. At the outermost end of each of the arms 3 is provided an opening 14 through which is passed the shank of a bolt 15 which is provided at one end with an elongated head 16.

The bolt 15 serves to securely clamp the flexible rings 5—5 to each radial finger 3 in the manner as indicated in Fig. 4. The radial fingers 3 are provided on their innermost sides with an elongated bearing face 17. The said elongated face having mounted thereon longitudinally extending members 18. The head 16 of the bolt 14 is provided with a broad bearing face 19 upon which is disposed longitudinally extending ribs 20. These ribs 20, together with the longitudinally extending members 18, serve to securely retain the flexible rings 5—5 in position relative to the radial fingers 3.

It can be readily seen that when power is applied through the medium of the driving shaft to the member B, there is a strain of rotation set up within the flexible rings 5—5. It can further be seen that there is a tendency to distribute this strain of rotation equally throughout the flexible rings 5—5 because of their having been clamped between the broad bearing surfaces 19 of the head 16 and the face 17 of the radial finger 3. It can be further seen that because of the construction that I have used in the bolt 15, that when the bolt 15 is placed in a position as shown in Fig. 4 and the clamping nut 21 has been screwed down upon the radial finger 3, the tendency toward rotation, because of the fact that the clamping nut 21 has been revolved, is lessened when the ribs 20 have become embedded in the flexible ring 5.

Having thus described my invention, what I claim as new is:

1. The combination with a flexible coupling comprising coupling members, and flexible rings disposed therebetween; of means for connecting said rings with said coupling members, said coupling means comprising a bolt having an elongated head provided with an elongated face.

2. The combination with a flexible coupling comprising coupling members, and flexible rings disposed therebetween; of means for connecting said rings with said coupling members, said coupling means comprising a bolt having an elongated head provided with an elongated serrated face.

3. The combination with a flexible coupling comprising coupling members, and flexible rings disposed therebetween; of means for connecting said rings with said coupling members, said coupling means comprising a bolt having an elongated head provided with an elongated serrated face and a plurality of ribs provided thereon and disposed longitudinally with respect to said face.

CHARLES ALLEN McCUTCHEON.